United States Patent
Shah et al.

(10) Patent No.: US 6,195,594 B1
(45) Date of Patent: Feb. 27, 2001

(54) REAL-TIME PLANNER FOR DESIGN

(75) Inventors: Sunil C. Shah, Los Altos; Pradeep Pandey, San Jose; Thorkell Gudmundsson, San Jose; Mark Erickson, Sunnyvale, all of CA (US)

(73) Assignee: Voyan Technology, Santa Clara, CA (US)

( * ) Notice: Subject to any disclaimer, the term of this patent is extended or adjusted under 35 U.S.C. 154(b) by 0 days.

(21) Appl. No.: 09/345,172

(22) Filed: Jun. 30, 1999

Related U.S. Application Data

(63) Continuation-in-part of application No. 09/199,708, filed on Nov. 24, 1998, which is a continuation of application No. 08/977,781, filed on Nov. 25, 1997, now Pat. No. 5,880,959.
(60) Provisional application No. 60/115,164, filed on Jan. 8, 1999.

(51) Int. Cl.[7] .................................................... G06F 19/00
(52) U.S. Cl. ................................................ 700/97; 703/2
(58) Field of Search ................................. 700/29, 31, 33, 700/36, 44, 45, 95, 97, 98, 103, 104, 182, 299, 90; 705/7, 8; 703/1, 2; 706/904, 919

(56) References Cited

U.S. PATENT DOCUMENTS 5,880,959  *  3/1999   Shah et al. ............................. 700/97
6,000,833  * 12/1999   Gershenfeld et al. ................... 703/2

* cited by examiner

Primary Examiner—William Grant
Assistant Examiner—Steven R. Garland
(74) Attorney, Agent, or Firm—Blakely, Sokoloff, Taylor & Zafman

(57) ABSTRACT

A method for computer aided design of a product or process. The method includes the steps of representing a computer-aided design activity as a design cycle. The design cycle is then converted into individual iterations of decisions to be made within the design cycle. The individual iterations of decisions are then mapped into a hierarchical structure of influence diagrams. The decision making process of the influence diagrams are performed and data is collected from the decision process that has been performed. The remaining unexecuted decisions and their posterior probabilities are updated based upon the outcomes of the decision process that was most recently performed.

70 Claims, 7 Drawing Sheets

REAL-TIME PLANNER FOR DESIGN

REFERENCE TO RELATED APPLICATIONS

This application is a continuation-in-part of application Ser. No. 09/199,708, titled "Method for Computer-Aided Design of a Product or Process", filed on Nov. 24, 1998, which is a continuation of application Ser. No. 08/977,781 filed Nov. 25, 1997, now U.S. Pat. No. 5,880,959, titled "Method for Computer-Aided Design of a Product or Process", issued on Mar. 9, 1999. This application also claims the benefit of U.S. Provisional Application No. 60/115,164, filed on Jan. 8, 1999.

BACKGROUND OF THE INVENTION

1. Field of the Invention

The present invention is in the field of methodologies for engineering design activities, and more particularly in the field of methodologies for computationally intensive signal processing design or control system design.

2. Background Information

Design of new products is becoming an increasingly complex activity because of reliance on high performance features requiring signal processing and feedback control. Many industries today also rely on complex processes to produce a product. For example, the semiconductor industry uses extremely complicated processes to produce products that typically have very narrow tolerances for final product characteristics. Another example is the disk drive industry. The disk drive industry pushes the limit on data storage and tries to store a large amount of information in relatively small area requiring very tight control over writing to and reading from the disk. Such situations present a challenge for those designing products and control systems, in part because design processes and control processes are very computationally intensive. Similar challenges exist in any area where a complex product must be designed or complex processes must be controlled.

In the areas of control of manufacturing processes or control of product behavior standard control and design methods are currently used. However, many modern products and manufacturing processes are too complex for such standard control and design methods to satisfactorily control and design them. Typical prior design and control methods are linear plans that do not provide alternatives required by the uncertainty of outcomes of computations and tests, and then permit planning based on resource utilization. Additionally, such prior methods do not incorporate actual experienced results of process execution and product design in order to adjust projections accordingly. It is difficult, if not impossible, to achieve satisfactory results using prior methods. There are many problems in applying such methods to complicated manufacturing processes and to the control of the behavior of high performance products.

For example, prior design tools typically automate fragments of the design activity in a linear fashion. Thus, results of design steps are unknown or uncertain before the steps are actually carried out. For instance, compute time, computational errors and exceptions, and results of physical tests cannot be known in advance to aid in decision making. These prior tools require a user to make a large number of complex decisions that depend upon many previous steps. This is a disadvantage because the user must usually possess specific knowledge or skills in order to properly use the information gained from the previous steps. It is a further disadvantage because intelligent decisions can only be made and incorporated after waiting for execution of design steps. No problem-specific guidance is available from prior tools for projecting with any accuracy what the results of design steps will be.

Prior design steps can become infeasible or highly suboptimal because of a user decision made many steps back. Prior design tools cannot help the user see future implications of current decisions. For these reasons, with prior tools, the user must learn by problem-specific experience, over a long period of time, to resolve unknowns and dependencies across design steps.

The problem of adequate control of complex processes is further exacerbated by a current division and separation of skill sets among those involved in the design process. For instance, control experts often do not have an in-depth knowledge of the process they are seeking to control. In addition, the proprietary nature of the processes often does not allow for acquisition of an in-depth knowledge of the process. On the other hand, process experts may know conventional control methods but do not know advanced control methods. Existing control design tools are designed for control experts, but are not suitable for process experts or those with just a basic knowledge in control.

Experienced control scientists have found ways to sidestep or solve these problems in specific cases. Significant shortcomings still surface, however, when less experienced control designers or team members from other disciplines apply existing software tools to manufacturing problems and high performance products. Consequently, current tools are inadequate for widespread use.

Most existing software design tools simply automate fragments of standard design methods and lower performance products. In general, the tools are ineffective when applied to control of manufacturing processes and high performance products for the reasons discussed above. FIG. 1 illustrates a convention design process paradigm. FIG. 1 is a specific example of a design of a controller for a thermally activated process. In the conventional paradigm of FIG. 1, scientists 102, process experts 108, and control experts 114 work within different domains with different tools. Scientists 102 typically operate in the domain of thermal models 104 using tools such as Fortran TWOPNT 106 (Grcar, J., *The TWOPNT Program for Boundary Value Problems*, Sandia National Laboratories, SAND 91–8230, April, 1992). Process experts 108 typically deal with the domain of process monitoring 110 using a tool such as Lab View® 112 (available from National Instruments, Austin Tex.). Control experts 114 are typically concerned with the domain of temperature control 116 and use tools such as MATRIX$_X$® 118 (available from Integrated Systems, Inc., Sunnyvale, Calif.), or MATLAB® 118 (available from Mathworks, Inc., Natick, Mass.). Efficient control requires an integration of information from each of domains 104, 110, and 116 in an easily usable format, which typically does not occur in current design tools.

SUMMARY OF THE INVENTION

A method for computer aided design of a product or process. The method includes the steps of representing a computer-aided design activity as a design cycle. The design cycle is then converted into individual iterations of decisions to be made within the design cycle. The individual iterations of decisions are then mapped into an influence diagram. The decision making process of the influence diagrams are performed and data is collected from the decision process that has been performed. The remaining unexecuted decisions and their posterior probabilities are updated based upon the data collected from the decision process that was most recently performed.

Additional features and benefits of the present invention will become apparent from the detailed description, figures, and claims set forth below.

BRIEF DESCRIPTION OF THE DRAWINGS

The present invention is illustrated by way of example and not limitation the accompanying figures in which.

DETAILED DESCRIPTION

A Real-Time Planner for Design is disclosed. In the following description, numerous specific details are set in order to provide a thorough understanding of the present invention. It will be obvious, however, to one skilled in the art that these specific details need not be employed to practice the present invention. In other instances, well known methods, procedures, and components have not been described in detail in order to avoid unnecessarily obscuring the present invention.

The present invention will be described in general terms of a design process wherein the design process requires computationally intensive design activities, for example the design of a product requiring signal processing or feedback control. The present invention uses hierarchical influence diagrams to which link the decisions, probabilities, costs, and outcomes of a design cycle together in a manner that will provide results based upon prior design steps and the estimations of what a particular decision will have on future design steps.

Bayesian networks are often used as a method of describing prior beliefs and the distribution of probabilities of events. In other words, the network describes the causality between events in between decisions and events. For example, a car stalls because it is out of gas. A Bayesian network may be used to identify the causality between the events and even illustrate what may have happened if one of the events or decisions was made differently. This example is illustrated in FIG. 2.

Figure 1:
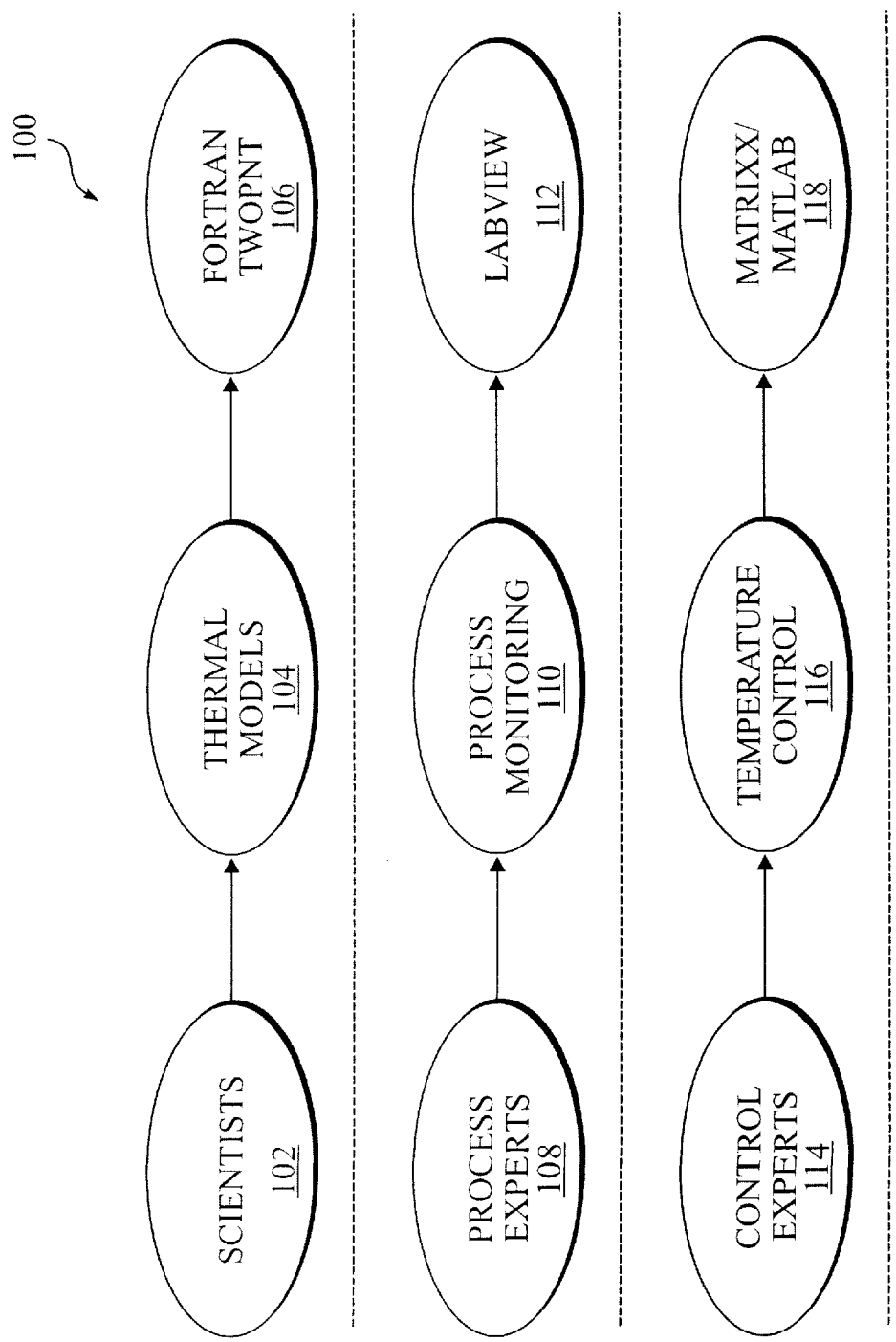
FIG. 1 is a diagram of a prior art design paradigm.
Figure 2:
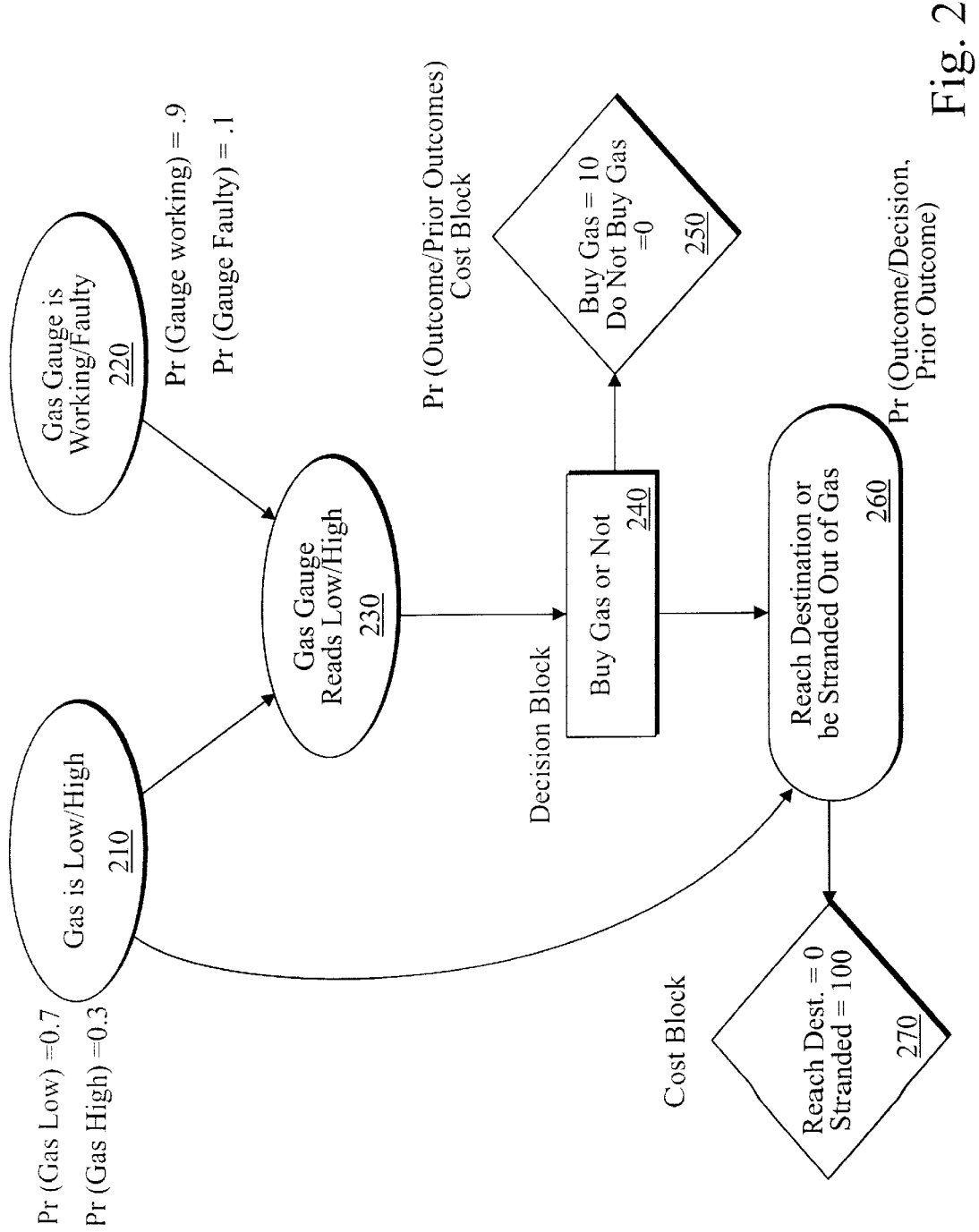
FIG. 2 illustrates an example of a Bayesian network.

FIG. 2 illustrates the car example in an influence diagram. An influence diagram is a special case of a Bayesian Network. In FIG. 2, the ovals represent probabilistic events. For example, oval 210 represents the event that the gas is low or the gas is high. In this example event 210 the probabilities are 0.7 that the gas is low and 0.3 that the gas is high.

Also in FIG. 2, the boxes represent decisions. For example, box 240 represents a binary decision to buy or not buy gas. The results of the binary decisions will have varying outcomes and costs associated with those outcomes.

The diamonds in FIG. 2 represent the costs associated with the outcomes of the decisions. For example, diamond 250 represents the costs associated with buying gas or not buying gas.

Additionally in FIG. 2, the arrows between ovals represent causal relationships and the arrows between a decision block or an oval and cost diamonds represent dependencies. Arrows between a decision block and an oval, for example from decision block 240 (i.e., buy gas or not) to oval 260 (i.e., reach destination or be stranded out of gas) represents the causal relation between the decision 240 and the outcome 260.

Conditional probability tables for the outcome 260 and (i.e., reach destination or be stranded out of gas) is given by Probability(Outcome|Prior Decision, Prior Outcomes of 230). Conditional probability table is given by Probability (Outcome|Prior Outcome of 210, Prior Outcome of 220). In other words, the probability of the gas gauge reading 230 depends on whether gas is low or high 210 and whether the gas gauge is working or faulty 220. The decision to buy or not buy gas 240, depends on the gas gauge reading 230. The probability of reaching the destination or not 260, depends on whether gas is low or high 210, and whether gas was bought or not 240.

Cost block 250 depends only on the decision 240 (i.e., to buy or not buy gas). Cost block 270 depends only on the outcome oval 260 (i.e., reach destination or be stranded). Such simple computations on influence diagrams can be performed using methods as described in Finn V. Jensen, *An Introduction to Bayesian Networks*, Springer, 1996.

The example of the car and driver in FIG. 2 is a simplistic view of Bayesian networks and how they work. The use of such networks in the design of complex manufacturing processes and in the design of high performance products require many more decisions that are based upon one another and the results of those decisions. Thus, the networks become very complex. As more decisions are made and more data is found, the posterior probabilities should be updated and upgraded based upon the data (or results) of the prior decisions that have been made. This presumably will enable the designer (or driver as in the example of FIG. 2) to make a more informed decision based upon the projected cost, time, and equipment needs for each path.

As stated in the background of the invention, however, such complex design processes require the knowledge of many experts within different areas of expertise. Thus, the updating of the posterior probabilities based upon the prior decisions becomes a complex and daunting task.

The present invention provides software tools that allow complete design iterations to be completed in a shorter period of time. The present invention also allows the design process to be performed by less specifically skilled personnel than prior methods. Thus, the present invention may be used by less experienced control designers or team members from other disciplines without requiring them to be experts in the process being performed or product being designed.

In the present invention the framework of decisions (i.e., probabilistic reasoning networks) used to illustrate the costs associated with the different outcomes of the probabilities of a complex design cycle are called influence diagrams. Influence diagrams are a special instance of the Bayesian Networks discussed above.

In one embodiment of the present invention the major steps of a design cycle are identified and mapped into networks of decisions in an influence diagram. The steps of the design cycle vary depending upon what in particular is being designed. For example, if a manufacturing process is being designed the steps of that process and decisions to be made during that process are mapped into an influence diagram. Likewise, in the design or control of a specific product the steps of designing and/or producing that product are mapped into an influence diagram.

Figure 3:
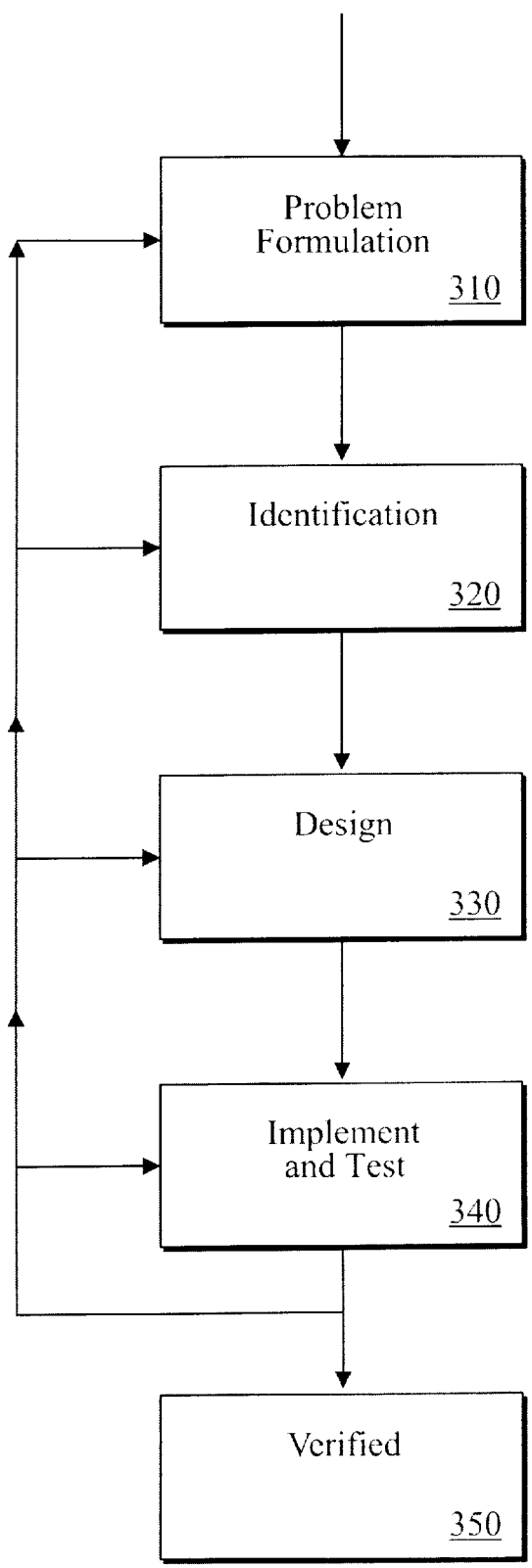
FIG. 3 illustrates a flow chart for a simplified example of a design cycle.

FIG. 3 illustrates a flow chart for a simplified example of a design cycle. As illustrated in FIG. 3, the design cycle starts with problem formulation at 310. At 320, identification of what is necessary to perform the manufacturing process or to design the product is determined. Next at 330, the manufacturing process or product is designed. At 340, the manufacturing process or product designed at 330, is implemented and tested. And finally, at 350, verification of the data and results from the implementation and test step is performed in order to determine the feasibility or success of the design cycle. The arrows (or feedback paths) shown in FIG. 3, illustrate that at almost any point it may be desirable to repeat a portion of the design cycle, for example if the results from the previous step of the design cycle are not desirable or do not give enough information to perform the next step.

It should be noted that in the present invention the design cycle may be performed in several ways. For example the design cycle may be performed physically (i.e., by actually physically designing the process or product) or the design cycle may be performed using a simulation model (or models) that simulate what would happen in the physical world. On the other hand, a combination of physical and simulation models may be used.

Figure 4:
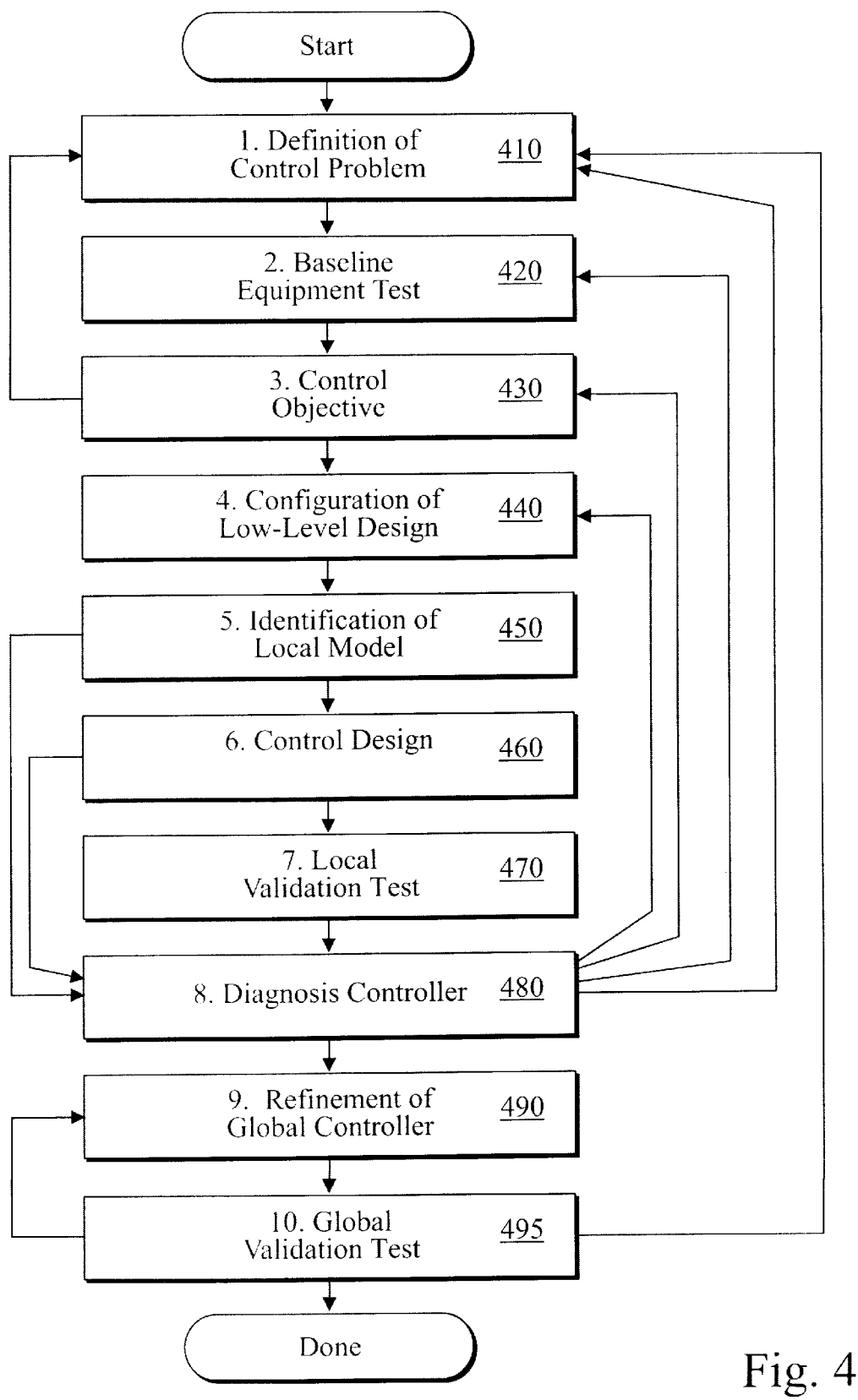
FIG. 4 illustrates an example of a more complex design cycle for controlling a nonlinear manufacturing process.

An example of a more complex design cycle for controlling a nonlinear manufacturing process is illustrated in FIG. 4. In this specific example the design cycle starts, at 410, by defining the control problem (i.e., what needs to be controlled). At 420, the baseline equipment is tested. The control objective is then formulated based upon the baseline equipment test, at 430. At 440, a low level design of the control problem is configured. At 450, the local models (i.e., the decisions of the process) are identified. After the decisions of the process are identified then the control system is designed, at 460, and the design is tested to determine the local validation of the local model, at 470. Using the data gathered from the test at 470, the controller is diagnosed at 480. Depending upon the diagnosis of the controller, several portions of the design cycle may be repeated (feedback arrows) or the design cycle may continue on.

If it is not necessary to repeat portions of the design cycle (i.e., the designed controller meets the requirements of the manufacturer/user), then at 490 the controller may be globally refined. At 495, the controller is then globally tested and validated. Depending upon the outcome of the global validation test the controller may need to be refined (back to 490) or the control objective may have to be redefined (back to 410), or if the controller meets the requirements of the user then the design cycle is finished and the controller designed is then used in the manufacturing process of the user.

It should be noted that feedback arrows are illustrated in FIG. 4 to demonstrate that many of the steps of the design cycle may be repeated in order to optimize the controller being designed. Feedforward arrows are also illustrated in FIG. 4 to demonstrate that some of the procedures of the design cycle may be skipped depending upon results of previous steps or depending upon the outcome desired by the user.

After determining the design cycle of the particular process or product being designed, the design cycle is then mapped into influence diagrams. The design cycle is mapped into the influence diagrams in a manner that describes the decisions to be made, the information being used to make the decisions, and the information being maintained along the way.

Mapping is performed by following the logical structure of the design cycle and describing each step in detail. Each step is then expanded upon by determining (or providing) alternative methods for solving each step of the design cycle. In other words, each step is picked apart to determine each of the potential decisions to be made and the possible outcomes of each of those decisions based upon all the potential possible previous decisions (or if the design process has already begun based upon the decisions already selected by the user). This process is performed until the complete design problem is mapped out.

The present invention then identifies the each of the alternative methods (or decisions) and selects one of the alternative methods by evaluating estimated cost metrics associated with the alternatives. Additionally, as the design cycle is executed, actual results of using particular methods for particular steps are used to dynamically reestimate the posterior probabilities and their potential cost metrics in order to choose future methods (or make future decisions). Thus, the probabilistic reasoning of the influence diagram is updated. In other words, after particular decisions have been made and using the information gathered from the results of the particular decision having been made the remainder of the alternative methods that are posterior to the decision that was made are updated with the new information.

It should be noted that the present invention does not make the decision for the user, but rather gives the user choices based upon the cost estimates of all the alternatives. It is ultimately the user who makes the decision and the present invention updates the posterior probabilities based upon the decisions made by the user and the outcomes of those decisions in order to evaluate future decisions.

Figure 5:
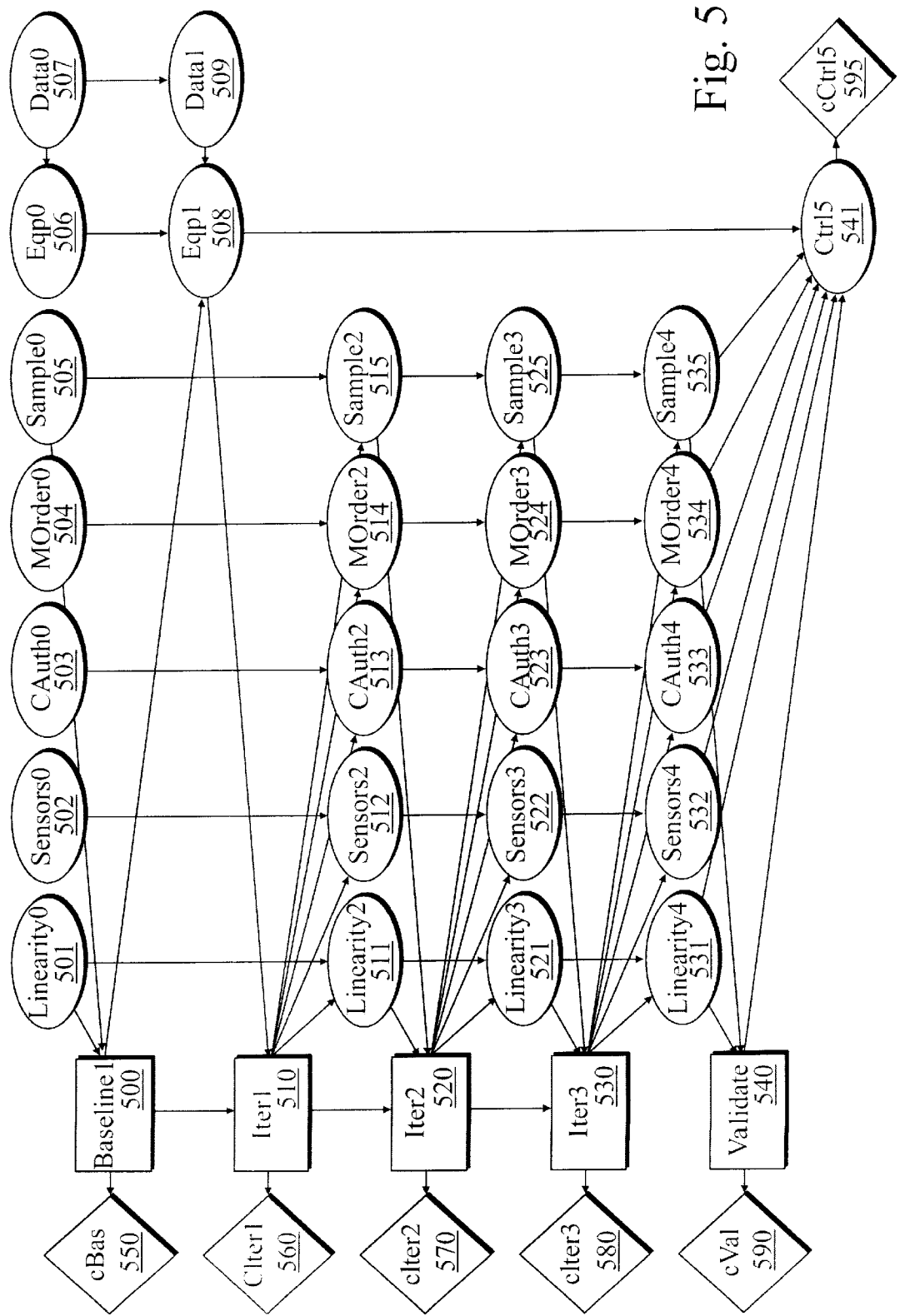
FIG. 5 illustrates an example of a high level influence diagram used in the design cycle of the control problem illustrated in FIG. 4.

FIG. 5 illustrates an example of an influence diagram used in the design cycle of the control problem illustrated in FIG. 4. In the influence diagram of FIG. 5, the squares (500, 510, 520, 530, 540) represent the "decisions" to be made during the design cycle. The bubbles (or chance nodes, 501–509, 511–515, 521–525, 531–535, 541) represent the "states" at different times in the design cycle during the various iterations. The diamonds (550, 560, 570, 580, 590) represent the "costs" associated with each decision and the diamond (595) represents the cost associated with reaching that particular state.

It is to be noted, that in FIG. 5, the relationships between the decisions, states, and costs are illustrated by a network of lines drawn between the illustrated symbols (or nodes). It should be noted, however, that due to the number of relationships illustrated lines may cross and/or appear to terminate at a node when in fact it does not. Thus, to alleviate a misunderstanding of the drawings a relationship only exists between two nodes where the arrow starts at one node and ends at the final node with an "arrow tip". In other words, if no arrow tip is illustrated then the arrow merely is "hidden behind" that node to reach a node at some other place and the line should be followed to its final destination that ends with an arrow tip. For example, there is a relationship between Iteration1 510 and Sample2 515.

In one embodiment of the present invention hierarchical influence diagrams are used. In one example, there may be a high level influence diagram that calls upon a low level influence diagram to perform some task. The high level influence diagram then uses the data gained from the low level influence diagram to update its own posterior probabilities. In other embodiments of the present invention multiple levels of influence diagrams are used to simplify the higher order influence diagrams and to decrease the compute time needed to update posterior probabilities of the higher order influence diagrams. Hierarchical levels of influence diagrams are used in complex situations where it would be too difficult to have a single influence diagram map out the entire design cycle because the operation costs associated with updating all the posterior probabilities in such a situation would be too great. The operation costs for evaluating a decision in such a complex influence diagram grows exponentially with the number of states in the influence diagram. Thus, evaluating a simple decision could take minutes to evaluate using a single complex influence diagram, as opposed to seconds to evaluate if a hierarchy of influence diagrams are used. In other words, the total cost of evaluating a decision can be cut dramatically by separating the decision making process into levels of influence diagrams.

The high level influence diagram will call the low level influence diagram and give the low level influence diagram the information necessary to evaluate a decision in the low level influence diagram based upon previous decisions made at the higher level. The lower level influence diagram solves a subproblem that will eventually be needed by the high level influence diagram and then gives the results to the higher level influence diagram which then updates the posterior probabilities based upon the information provided by the lower level influence diagram.

In the example given above for the design cycle of a controller in a nonlinear manufacturing process (the discussion of FIGS. 4 and 5), the influence diagram illustrated in FIG. 5 is a high level influence diagram. In this example, the high level influence diagram addresses the choosing of configuration parameters for the design cycle and what decisions need to be made when the user's control specifications are not met with the current values in the configuration parameters. Such configuration parameters may include, but are not limited to: model dimensions, sample rates, controller dimensions, operating point location and numbers, number of total iterations at the next lower level, diagnosis sensors, production sensors, actuators, and setup cycle parameters.

In the controller example of FIGS. 4 and 5, the states (or chance nodes) of the high level design cycle include: local linearity for the operating points (501, 511, 521, 531); adequacy of production and diagnostic sensors to provide the required estimation accuracy (502, 512, 522, 532); control authority (503, 513, 523, 533); adequacy of model and/or controller orders (504, 514, 524, 534); and adequacy of sample rates (505, 515, 525, 535). The high level influence diagram calls upon a lower level influence diagram to solve a problem that the high level influence diagram will need eventually.

Figure 6:
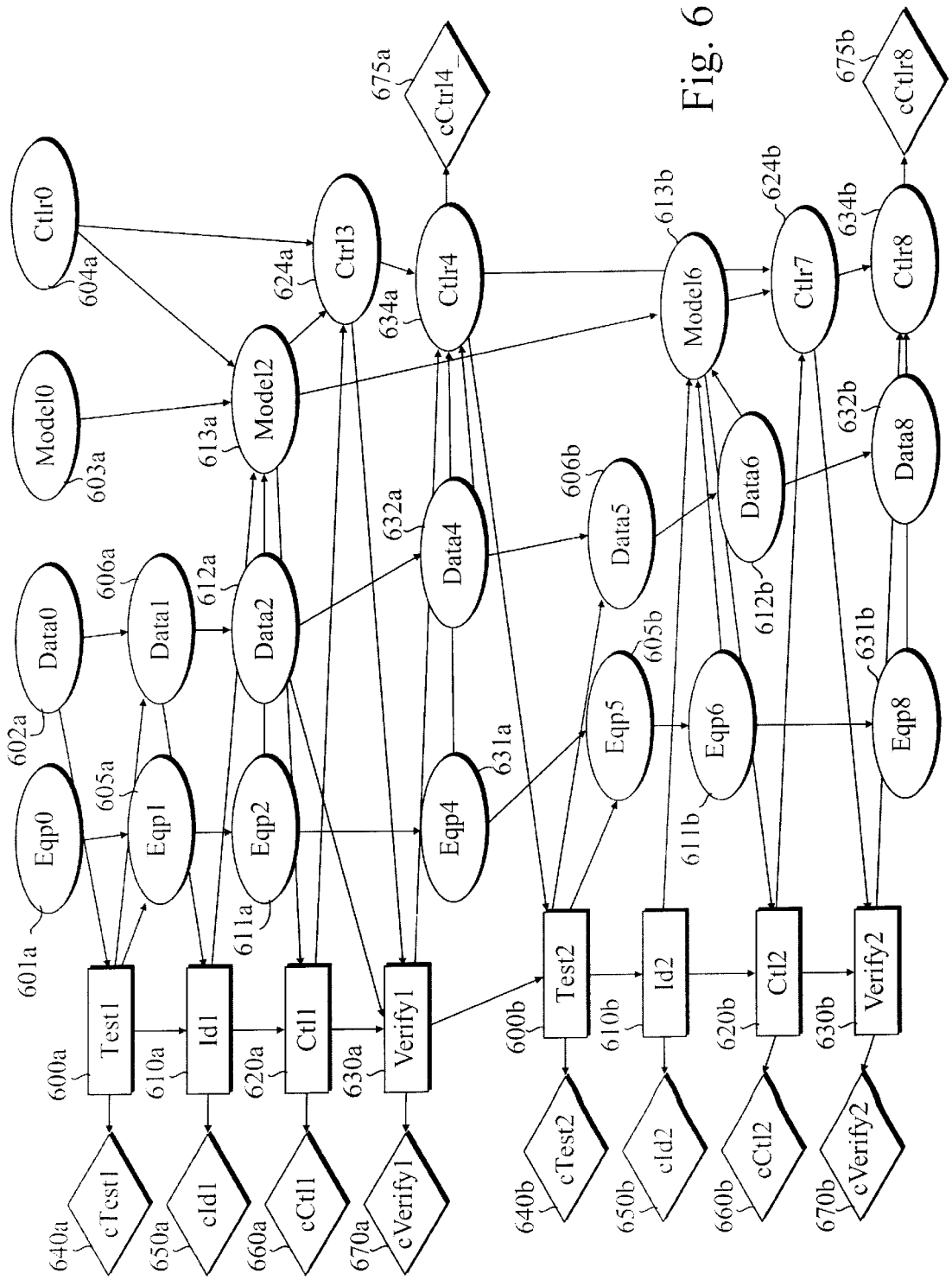
FIG. 6 illustrates an example of a lower level influence diagram.

In the controller example above, the high level influence diagram calls upon a lower level influence diagram for other probabilities, such as information about the equipment, data, and model. FIG. 6 illustrates an example of one such lower level influence diagram. In the example of the low level influence diagram of FIG. 6, the symbols (or nodes) represent the same ideals as in the higher level influence diagram (i.e., the costs, the decisions, and the states). In the controller example of FIGS. 4, 5, and 6, the states (or chance nodes) of the low level design cycle include: the probability that the equipment is good or bad (i.e., functioning properly or not functioning properly; 601*a*, 605*a&b*, 611*a&b*, 631*a&b*); the probability that the data is good or bad (602*a*, 606*a&b*, 612*a&b*, 632*a&b*); the probability that the model is good or bad (603*a*, 613*a&b*); and the effect on the controller (604*a*, 624*a&b*, 634*a&b*).

Using the present invention, each point of the design cycle is evaluated internally using the influence diagrams to determine all of the future decisions that have not yet been made and how that decision and its costs will affect all of the future decisions and their costs over all the potential paths. Once a decision is made, then the observations (for example, outcomes, costs, data, etc. of that decision) are made and the posterior probabilities of the influence diagrams are updated based upon that prior decision.

The design cycle is mapped into an influence diagram based upon the decisions that need to be made. Where there are loops, those loops are broken out into another level of influence diagrams. Next, the entities or quantities that are to be considered in making the decisions are determined, probabilities are assigned to each of these entities/quantities and are placed into the influence diagram. Then it is determined how one state affects another to build the relationship between the nodes in the influence diagram.

As the system is run, in one embodiment of the present invention, the alternative paths and their relationships in the low level influence diagram are broken out into a long test, a short test, and skip the test altogether. It should be noted that there are other ways to break this out, for example, instead of using time, you could break it out by cost (i.e., more expensive, less expensive, skip to avoid the cost), etc.

An example of this process can be demonstrated by looking to the low level influence diagram of FIG. 6. The high level influence diagram of FIG. 5 passes to the low level influence diagram some values for the initial settings, e.g., Eqp0 601*a*, Data0 602*a*, Model0 603*a*, and Ctrl0 604*a*. A test ,Test1 600*a*, is run on the equipment using Data0 602*a*, and results in a new set of data, Data1 606*a* and a new state for equipment, Eqp1 605*a*. Data1 606*a* is then used in an identification process, ID1 610*b*, to identify problems or results and to find a model that fits the data, which results in Model2 613*a*. Model2 613*a* is then used in the control process, Ctl1 620*c*, to build a new controller, Ctlr3 624*a*. At verify, Verify1 630*a*, the data from Data2 612*a* and the new controller Ctrl3 624*a* are used on the actual equipment to verify the results found using the model. However, the user has the option to use the new controller, Ctrl3 624*a*, or use the previous controller, Ctrl0 604*a*, by hitting skip. An additional iteration of the low level influence diagram is also shown in FIG. 6, but will not be discussed in detail herein.

At each decision, for example in FIG. 6, the decisions are Test1 600*a*, ID1 620*a*, Ctl1 620*a*, and Verify1 630*a*, the costs associated with each decision are calculated and updated as cTest1 640*a*, cID 650*a*, cCtl1 660*a*, and cVerify1 670*a*. There are additional costs associated with the design process which are referred to as terminal or state costs. The state costs are the costs of actually achieving a particular state. For example, in FIG. 6, there is a state cost, cCtlr4 675*a*, associated with the development of the new controller, ctlr4 634*a*. The high level influence diagram keeps track of the overall (or total) process costs and can recall the low level influence diagram whenever necessary to update the total costs.

If at the high level the decision has been made to disregard the low level, then the high level makes bounding calculations which are the best and worst case scenarios based upon an approximation (or assumption) of what the high level approximates that the low level outcome will be. The high level influence diagram makes these assumptions by running through a simulated sequence of decisions. During each iteration of the simulation an estimate is made of what has the highest probability of occurring. A decision is then chosen which corresponds to the best cost based upon the highest probability of occurring. Choosing the decision with the best cost and highest probability of occurring tells the user the predicted sequence (or predicted path). Then from the predicted sequence the high level influence diagram computes the predicted cost from the costs of each predicted decision.

The present invention creates a hard bound on the iterations of the design sequence by assuming a predicted path and running it over and over again for a fixed number of iterations. The hard bounds are then used in the actual design sequence as a sort of check on the system. If the system during the actual design sequence exceeds those bounds then this tells the user that a problem exists and thus diagnosis of the potential problem should be performed.

Diagnosis influence diagrams may be built into the system as a lower level influence diagram. In the example of the design cycle for the controller given above, several areas may be targeted for diagnosis of problems. For example, the nonlinearity of the system to be controlled, poor control authority, inadequate sensors, poor equipment conditions, etc. maybe places to start when looking to diagnose a problem. The data collected during iterations of the system will help to diagnose the problem and the diagnosis influence diagram can take that information to determine a course of action. The course of actions could be to reformulate the problem, redesign the equipment, fix or repair the equipment, redesign the model, redesign the controller, etc. It should be noted that the diagnosis influence diagrams are created in much the same way as the high level and low level influence diagrams described earlier and their creation is therefore not discussed in detail herein.

Figure 7:
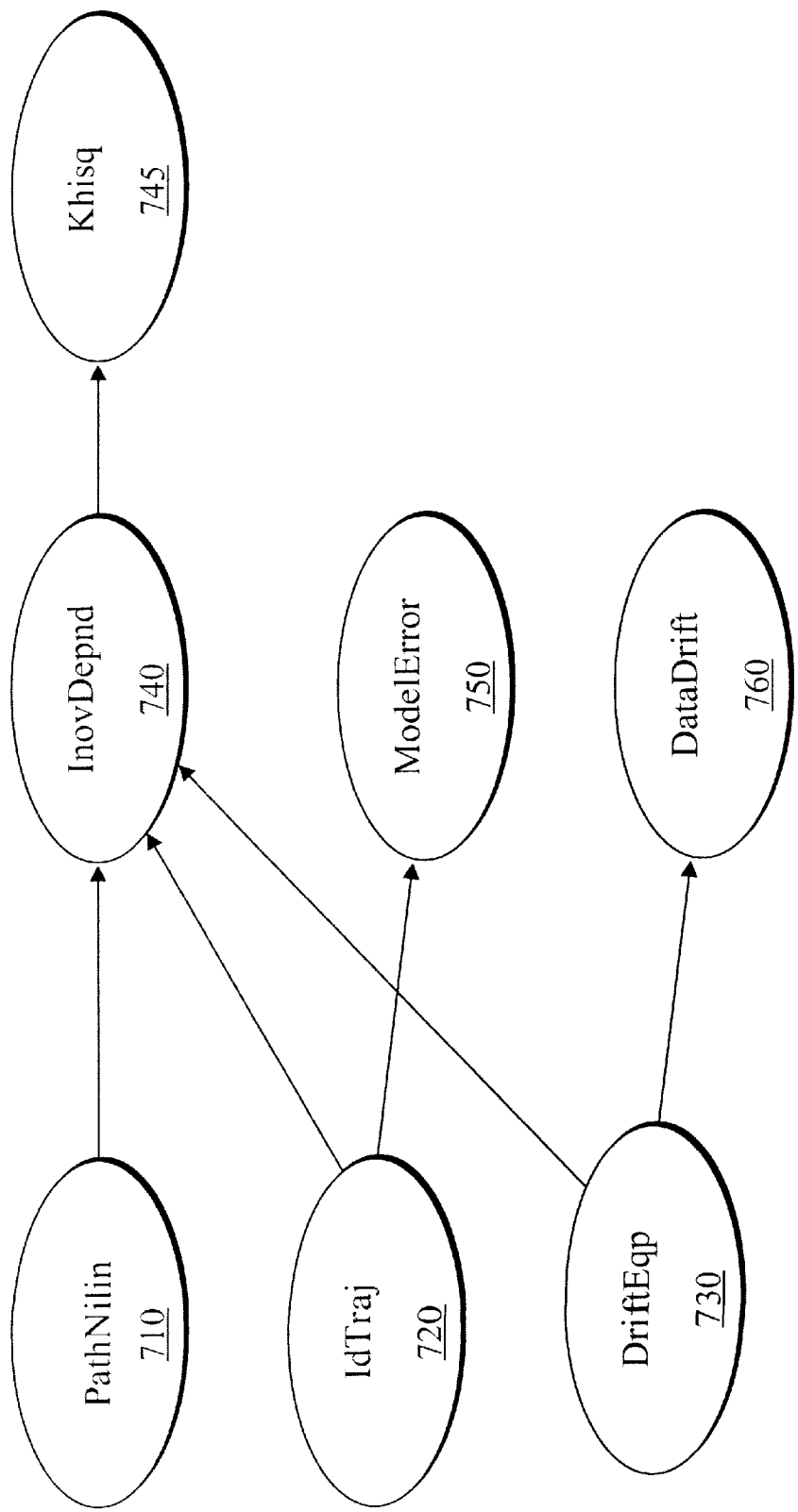
FIG. 7 illustrates an example of a diagnosis influence diagram of one embodiment of the present invention.

FIG. 7 illustrates an example of a diagnosis influence diagram of one embodiment of the present invention. The diagnosis influence diagram illustrates three potential problems that may be diagnosed: path nonlinearity 710, poor identification trajectory 720, and equipment drifts 730. It should be noted that other problems in a system may also be diagnosed and that the embodiment shown in FIG. 7 is merely meant to be illustrative and not limiting.

The user makes observations about how the system is working in order to diagnose problems in the system. In the example illustrated in FIG. 7, to determine if the problem is related to path nonlinearity 710, the user must determine if the innovations are dependent 740. If innovations are dependent then there is a statistical dependence. To determine if innovations are dependent (i.e. if statistical dependence exists) a Khi square test ($\chi^2$) 745 may be performed. The khi square test is well known in the art and therefore is not described in detail herein.

To determine if the problem is related to a poor identification (ID) trajectory 720, the user may determine if the innovations are dependent 745 and/or if the model error 750 is large. The model error 750 is proportional to the uncertainty that is computed from identification. If the uncertainty is large then the model error 750 is large and the identification trajectory 720 is poor. Thus, if the innovations are dependent 740 and/or the model error 750 is large then the problem with the system is likely to be a poor identification trajectory 720.

To determine if the problem is related to a drift in the equipment 730, the user may determine if the innovations are dependent 745 and/or if there is a data drift 760. If there is a drift in the data then there is a drift in the equipment. Thus, if the innovations are dependent 740 and/or there is a drift in the data 760 then the problem with the system is likely to be a drift in the equipment 730.

It should be noted that the influence diagrams of the Figures discussed above are represented as having a finite number of loops so as to create a finite growing influence diagram at any time. It should also be noted that the finite number of loops may increase or decrease depending upon the number of iterations needed to design the particular process or product within the desired specifications of the user.

The present invention may be used in the design of products and processes in a variety of industries. Some examples are in semiconductor manufacturing; disk drive and servo control systems; motors; computer storage and multimedia; communication networking and wireless applications; consumer goods such as cameras, appliances, batteries, and toys; and automotive applications such as antilock braking systems, engine control, and suspension systems. It should be noted that the industries listed are merely examples in which the present invention may be used and that such a list is not meant to be limiting.

Thus, a Real-Time Planner for Design has been described. Although specific embodiments, including specific equipment, parameters, methods, and procedures have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

What is claimed is:

1. A method comprising:
   representing a computer-aided design activity as a design cycle;
   converting the design cycle into individual iterations of decisions to be made in the design cycle;
   mapping the individual iterations of decisions to be made into an influence diagram;
   performing a decision making process within the influence diagram;
   collecting data from the decision process that has been performed;
   updating posterior probabilities based upon the data collected from the decision process that was most recently performed.

2. The method of claim 1 wherein the step of mapping the individual iterations of decisions to be made is performed such that the decision being made, the information being used to make the decision, and the information that is to be maintained along the way of the design cycle are represented in the influence diagram.

3. The method of claim 1 wherein the step of updating posterior probabilities updates the framework of decisions that must now be made based upon the prior decisions.

4. The method of claim 1 wherein the step of updating posterior probabilities updates the probabilistic reasoning of future decisions based upon the prior decisions.

5. The method of claim 1 wherein the step of updating posterior probabilities updates the costs associated with the different outcomes that are based upon the prior decisions.

6. The method of claim 1 further comprising the step of:
   assigning a probability to a decision in the influence diagram.

7. The method of claim 1 wherein the influence diagram is a hierarchy of influence diagrams including a high level influence diagram and a low level influence diagram.

8. The method of claim 7 wherein the low level influence diagram contains decisions that represent smaller subproblems that the high level influence diagram will need to perform the decisions within the high level influence diagram.

9. The method of claim 7 wherein the high level influence diagram accesses the low level influence diagram to obtain information that the high level influence diagram needs to perform a decision within the high level influence diagram.

10. The method of claim 7 wherein the high level influence diagram sets hard bounds in order to determine if a problem needs to be diagnosed.

11. The method of claim 1 wherein the influence diagram is a hierarchy of influence diagrams having multiple levels of influence diagrams.

12. The method of claim 11 wherein the multiple levels of influence diagrams include a diagnosis influence diagram.

13. A method comprising:
representing a computer-aided design activity as a design cycle;
converting the design cycle into individual iterations of decisions to be made in the design cycle;
mapping the individual iterations of decisions to be made into a hierarchy of influence diagrams;
performing a decision making process within the hierarchy of influence diagrams;
collecting data from the decision process that has been performed;
updating posterior probabilities based upon the data collected from the decision process that was most recently performed.

14. The method of claim 13 wherein the step of mapping the individual iterations of decisions to be made is performed such that the decision being made, the information being used to make the decision, and the information that is to be maintained along the way of the design cycle are represented in the hierarchy of influence diagrams.

15. The method of claim 13 wherein the step of updating posterior probabilities updates the framework of decisions that must now be made based upon the prior decisions.

16. The method of claim 13 wherein the step of updating posterior probabilities updates the probabilistic reasoning of future decisions based upon the prior decisions.

17. The method of claim 13 wherein the step of updating posterior probabilities updates the costs associated with the different outcomes that are based upon the prior decisions.

18. The method of claim 13 further comprising the step of:
assigning a probability to a decision in the hierarchy of influence diagrams.

19. The method of claim 13 wherein the hierarchy of influence diagrams includes a high level influence diagram and a low level influence diagram.

20. The method of claim 19 wherein the low level influence diagram contains decisions that represent smaller subproblems that the high level influence diagram will need to perform the decisions within the high level influence diagram.

21. The method of claim 19 wherein the high level influence diagram accesses the low level influence diagram to obtain information that the high level influence diagram needs to perform a decision within the high level influence diagram.

22. The method of claim 19 wherein the high level influence diagram sets hard bounds in order to determine if a problem needs to be diagnosed.

23. The method of claim 22 wherein the hierarchy of influence diagrams further includes a diagnosis influence diagram that the high level influence diagram calls upon when the hard bounds are exceeded.

24. The method of claim 13 wherein the influence diagram is the hierarchy of influence diagrams has multiple levels of influence diagrams.

25. The method of claim 24 wherein the multiple levels of influence diagrams include a diagnosis influence diagram.

26. A method comprising:
representing a computer-aided design activity as a design cycle;
converting the design cycle into individual iterations of decisions to be made in the design cycle;
mapping the individual iterations of decisions to be made into a hierarchy of influence diagrams wherein major decisions of the design cycle are included in a high level influence diagram and wherein loops of the design cycle are broken out into lower level influence diagrams;
performing a decision making process within the hierarchy of influence diagrams;
collecting data from the decision process that has been performed;
updating posterior probabilities based upon the data collected from the decision process that was most recently performed.

27. The method of claim 26 wherein the step of mapping the individual iterations of decisions to be made is performed such that the decision being made, the information being used to make the decision, and the information that is to be maintained along the way of the design cycle are represented in the hierarchy of influence diagrams.

28. The method of claim 26 wherein the step of updating posterior probabilities updates the framework of decisions that must now be made based upon the prior decisions.

29. The method of claim 26 wherein the step of updating posterior probabilities updates the probabilistic reasoning of future decisions based upon the prior decisions.

30. The method of claim 26 wherein the step of updating posterior probabilities updates the costs associated with the different outcomes that are based upon the prior decisions.

31. The method of claim 26 further comprising the step of:
assigning a probability to a decision in the hierarchy of influence diagrams.

32. The method of claim 26 wherein the low level influence diagram contains decisions that represent smaller subproblems that the high level influence diagram will need to perform the decisions within the high level influence diagram.

33. The method of claim 26 wherein the high level influence diagram accesses the low level influence diagram to obtain information that the high level influence diagram needs to perform a decision within the high level influence diagram.

34. The method of claim 26 wherein the high level influence diagram sets hard bounds in order to determine if a problem needs to be diagnosed.

35. The method of claim 34 wherein the hierarchy of influence diagrams further includes a diagnosis influence diagram that the high level influence diagram calls upon when the hard bounds are exceeded.

36. A computer readable medium containing executable instructions which, when executed in a processing system, cause said system to perform a method comprising:
representing a computer-aided design activity as a design cycle;

converting the design cycle into individual iterations of decisions to be made in the design cycle;

mapping the individual iterations of decisions to be made into an influence diagram;

performing a decision making process within the influence diagram;

collecting data from the decision process that has been performed;

updating posterior probabilities based upon the data collected from the decision process that was most recently performed.

37. The computer readable medium of claim 36 wherein mapping the individual iterations of decisions to be made is performed such that the decision being made, the information being used to make the decision, and the information that is to be maintained along the way of the design cycle are represented in the influence diagram.

38. The computer readable medium of claim 36 wherein updating posterior probabilities updates the framework of decisions that must now be made based upon the prior decisions.

39. The computer readable medium of claim 36 wherein updating posterior probabilities updates the probabilistic reasoning of future decisions based upon the prior decisions.

40. The computer readable medium of claim 36 wherein updating posterior probabilities updates the costs associated with the different outcomes that are based upon the prior decisions.

41. The computer readable medium of claim 36 further comprising:

assigning a probability to a decision in the influence diagram.

42. The computer readable medium of claim 36 wherein the influence diagram is a hierarchy of influence diagrams including a high level influence diagram and a low level influence diagram.

43. The computer readable medium of claim 42 wherein the low level influence diagram contains decisions that represent smaller subproblems that the high level influence diagram will need to perform the decisions within the high level influence diagram.

44. The computer readable medium of claim 42 wherein the high level influence diagram accesses the low level influence diagram to obtain information that the high level influence diagram needs to perform a decision within the high level influence diagram.

45. The computer readable medium of claim 42 wherein the high level influence diagram sets hard bounds in order to determine if a problem needs to be diagnosed.

46. The computer readable medium of claim 45 wherein the multiple levels of influence diagrams include a diagnosis influence diagram.

47. The computer readable medium of claim 36 wherein the influence diagram is a hierarchy of influence diagrams having multiple levels of influence diagrams.

48. A computer readable medium containing executable instructions which, when executed in a processing system, cause said system to perform a method comprising:

representing a computer-aided design activity as a design cycle;

converting the design cycle into individual iterations of decisions to be made in the design cycle;

mapping the individual iterations of decisions to be made into a hierarchy of influence diagrams;

performing a decision making process within the hierarchy of influence diagrams;

collecting data from the decision process that has been performed;

updating posterior probabilities based upon the data collected from the decision process that was most recently performed.

49. The computer readable medium of claim 48 wherein mapping the individual iterations of decisions to be made is performed such that the decision being made, the information being used to make the decision, and the information that is to be maintained along the way of the design cycle are represented in the hierarchy of influence diagrams.

50. The computer readable medium of claim 48 wherein updating posterior probabilities updates the framework of decisions that must now be made based upon the prior decisions.

51. The computer readable medium of claim 48 wherein updating posterior probabilities updates the probabilistic reasoning of future decisions based upon the prior decisions.

52. The computer readable medium of claim 48 wherein updating posterior probabilities updates the costs associated with the different outcomes that are based upon the prior decisions.

53. The computer readable medium of claim 48 further comprising:

assigning a probability to a decision in the hierarchy of influence diagrams.

54. The computer readable medium of claim 48 wherein the hierarchy of influence diagrams includes a high level influence diagram and a low level influence diagram.

55. The computer readable medium of claim 54 wherein the low level influence diagram contains decisions that represent smaller subproblems that the high level influence diagram will need to perform the decisions within the high level influence diagram.

56. The computer readable medium of claim 54 wherein the high level influence diagram accesses the low level influence diagram to obtain information that the high level influence diagram needs to perform a decision within the high level influence diagram.

57. The computer readable medium of claim 54 wherein the high level influence diagram sets hard bounds in order to determine if a problem needs to be diagnosed.

58. The computer readable medium of claim 57 wherein the hierarchy of influence diagrams further includes a diagnosis influence diagram that the high level influence diagram calls upon when the hard bounds are exceeded.

59. The computer readable medium of claim 48 wherein the influence diagram is the hierarchy of influence diagrams has multiple levels of influence diagrams.

60. The computer readable medium of claim 59 wherein the multiple levels of influence diagrams include a diagnosis influence diagram.

61. A computer readable medium containing executable instructions which, when executed in a processing system, cause said system to perform a method comprising:

representing a computer-aided design activity as a design cycle;

converting the design cycle into individual iterations of decisions to be made in the design cycle;

mapping the individual iterations of decisions to be made into a hierarchy of influence diagrams wherein major decisions of the design cycle are included in a high level influence diagram and wherein loops of the design cycle are broken out into lower level influence diagrams;

performing a decision making process within the hierarchy of influence diagrams;

collecting data from the decision process that has been performed;

updating posterior probabilities based upon the data collected from the decision process that was most recently performed.

62. The computer readable medium of claim 61 wherein mapping the individual iterations of decisions to be made is performed such that the decision being made, the information being used to make the decision, and the information that is to be maintained along the way of the design cycle are represented in the hierarchy of influence diagrams.

63. The computer readable medium of claim 61 wherein updating posterior probabilities updates the framework of decisions that must now be made based upon the prior decisions.

64. The computer readable medium of claim 61 wherein updating posterior probabilities updates the probabilistic reasoning of future decisions based upon the prior decisions.

65. The computer readable medium of claim 61 wherein updating posterior probabilities updates the costs associated with the different outcomes that are based upon the prior decisions.

66. The computer readable medium of claim 61 further comprising:

assigning a probability to a decision in the hierarchy of influence diagrams.

67. The computer readable medium of claim 61 wherein the low level influence diagram contains decisions that represent smaller subproblems that the high level influence diagram will need to perform the decisions within the high level influence diagram.

68. The computer readable medium of claim 61 wherein the high level influence diagram accesses the low level influence diagram to obtain information that the high level influence diagram needs to perform a decision within the high level influence diagram.

69. The computer readable medium of claim 61 wherein the high level influence diagram sets hard bounds in order to determine if a problem needs to be diagnosed.

70. The computer readable medium of claim 69 wherein the hierarchy of influence diagrams further includes a diagnosis influence diagram that the high level influence diagram calls upon when the hard bounds are exceeded.

* * * * *